US008027051B2

(12) United States Patent
Hozumi

(10) Patent No.: US 8,027,051 B2

(45) Date of Patent: Sep. 27, 2011

(54) REMOTE MONITORING SYSTEM FOR QUICKLY DEALING WITH A BUG

(75) Inventor: Hiroshi Hozumi, Fuchu (JP)

(73) Assignee: Ricoh Company, Ltd., Tokyo (JP)

( * ) Notice: Subject to any disclaimer, the term of this patent is extended or adjusted under 35 U.S.C. 154(b) by 1224 days.

(21) Appl. No.: 11/688,674

(22) Filed: Mar. 20, 2007

(65) Prior Publication Data

US 2007/0285689 A1 Dec. 13, 2007

(30) Foreign Application Priority Data

Mar. 20, 2006 (JP) ................................ 2006-077676

(51) Int. Cl.
*G06F 3/12* (2006.01)
*G06K 15/00* (2006.01)

(52) U.S. Cl. ...................... 358/1.15; 358/1.14; 358/1.16

(58) Field of Classification Search ................ 358/1.15, 358/1.16, 1.18, 1.1, 1.6, 1.9, 1.13, 1.14, 1.17, 358/400, 401, 404, 406, 407, 437, 444, 468, 358/434; 347/2, 3, 5, 14, 23; 399/1, 8, 9, 399/10, 11, 18, 19, 20; 710/15, 17, 18, 19, 710/62, 72, 8; 713/340

See application file for complete search history.

(56) References Cited

FOREIGN PATENT DOCUMENTS

| | | |
|---|---|---|
| JP | 58-112147 | 7/1983 |
| JP | 2000-20344 | 1/2000 |
| JP | 2003-5991 | 1/2003 |
| JP | 2005-235087 | 9/2005 |
| JP | 2006-11718 | 1/2006 |

OTHER PUBLICATIONS

Office Action issued Oct. 19, 2010, in Japan Patent Application No. 2006-077676.

*Primary Examiner* — Dov Popovici

(74) *Attorney, Agent, or Firm* — Oblon, Spivak, McClelland, Maier & Neustadt, L.L.P.

(57) ABSTRACT

A printing apparatus remote monitoring system includes a center system that remotely monitors a plurality of printing apparatuses, and a plurality of monitoring mediation apparatuses that mediate communications between the plurality of printing apparatuses and the center system. The center system includes a bug countermeasure policy storage device that stores software bug information created in each of the printing apparatuses, linking it with a bug countermeasure policy. The software bug information includes a type of the printing apparatus, a version of firmware implemented in the printing apparatus, and abnormal information occurring during running of the firmware in the printing apparatus.

6 Claims, 8 Drawing Sheets

| MODEL | MODEL NUMBER | FIRM VERSION | ABNORMAL CONDITION AND FREQUENCY | COUNTERMEASURE | ACQUIRED DEBUG LOG NUMBER | ACQUIRED TIME PERIOD | DEBUG LOG NOTIFICATION DESTINATION |
|---|---|---|---|---|---|---|---|
| AAAA | 00000—200000 | —1.01 | SC001 OCCURRENCE | UPDATING FIRM INTO THE NEWEST | - | - | - |
| | | | SC002 CONTINUOUS OCCURRENCE WITHIN 24 HOURS | | | | |
| | | | ACQUIRED INFORMATION 003 ABNORMAL | ACQUIRING DEBUG LOG rsh | 2000 2222 7777 8181 STANDARD OUTPUT | ONE MONTH | DESIGNER XXX |
| | | | ⋮ | ⋮ | ⋮ | ⋮ | ⋮ |
| | | 1.02 | SC001 OCCURRENCE | ACQUIRING DEBUG LOG HTTPS/SOAP | 2000 2222 7777 8181 STANDARD OUTPUT | SNAP SHOT | DESIGNER XXX |

FIG. 2B

| | | | | | | | |
|---|---|---|---|---|---|---|---|
| | | | SC002 CONTINUOUS OCCURRENCE WITHIN 24 HOURS | ACQUIRING DEBUG LOG AFTER UPDATING INTO LOG BRING UP USE SPECIAL FIRM 1.02-log | 1000 2222 3000 3500 STANDARD OUTPUT | ONE WEEK | DESIGNER YYY |
| | | | ACQUIRED INFORMATION 003 ABNORMAL | ACQUIRING DEBUG LOG rsh | 2000 2222 7777 8181 STANDARD OUTPUT | ONE MONTH | DESIGNER XXX |
| | | | ⋮ | ⋮ | ⋮ | ⋮ | ⋮ |
| | 200000— | —1.01 | SC001 OCCURRENCE | UPDATING FIRM INTO 1.02 | – | – | – |
| | | | SC002 CONTINUOUS OCCURRENCE WITHIN 24 HOURS | | | | |
| | | | ACQUIRED INFORMATION 003 ABNORMAL | ACQUIRING DEBUG LOG rsh | 2000 2222 7777 8181 STANDARD OUTPUT | ONE MONTH | DESIGNER XXX |

FIG. 2C

| | | | | | | | |
|---|---|---|---|---|---|---|---|
| | | | ⋮ | ⋮ | ⋮ | ⋮ | ⋮ |
| | | 1.02 | SC001 OCCURRENCE | ACQUIRING DEBUG LOG HTTPS/SOAP | 2000<br>2222<br>7777<br>8181<br>STANDARD OUTPUT | SNAP SHOT | DESIGNER XXX |
| | | | SC002 CONTINUOUS OCCURRENCE WITHIN 24 HOURS | ACQUIRING DEBUG LOG AFTER UPDATING INTO LOG BRING UP USE SPECIAL FIRM 1.02-log | 1000<br>2222<br>3000<br>3500<br>3600<br>STANDARD OUTPUT | ONE WEEK | DESIGNER YYY |
| | | | ACQUIRED INFORMATION 003 ABNORMAL | ACQUIRING DEBUG LOG rsh | 2000<br>2222<br>7777<br>8181<br>STANDARD OUTPUT | ONE MONTH | DESIGNER XXX |
| | | | ⋮ | ⋮ | ⋮ | ⋮ | ⋮ |
| ⋮ | ⋮ | ⋮ | ⋮ | ⋮ | ⋮ | ⋮ | ⋮ |

REMOTE MONITORING SYSTEM FOR QUICKLY DEALING WITH A BUG

CROSS REFERENCE TO RELATED APPLICATION

This application claims priority under 35 USC §119 to Japanese Patent Application No. 2006-077676 filed on Mar. 20, 2006, the entire contents of which are hereby incorporating by reference.

BACKGROUND OF THE INVENTION

1. Field of the Invention

The present invention relates to a remote printing apparatus monitoring system, and in particular, to the remote printing apparatus monitoring system suitable for monitoring printing apparatuses that operate in accordance with firmware.

2. Discussion of the Background Art

A conventional remote monitoring system for monitoring image printing apparatuses includes a mediation apparatus between the image printing apparatus and a remote monitoring center. The mediation apparatus collects counter log of a number of sheets printed in the image printing apparatus as a monitoring objective as well as condition information by means of protocol, such as HTTPS/SOAP, MIB, etc. (HTTPS=HyperTextTransferProtocolover SSL, SOAP=Simple Object Access Protocol, MIB=Management Information Base)

Otherwise, the mediation apparatus receives a report from the image printing apparatus and notifies the center of the report when the printing apparatus causes abnormality, thereby controlling the printing apparatus monitoring system.

In such a conventional system, however, a sensor can easily detect almost all of the reports, such as malfunction of parts the printing apparatus is caused by potential software bug, etc.

Further, when abnormality caused in, such a cause is summarized as software error and is reported. Thus, the abnormality sometimes is neglected until a serious problem.

Further, debug log need to be collected to analyze an abnormal condition of the printing apparatus. Such debug log is temporarily stored in storage and quickly disappears after a prescribed time period from the storage. Since debug log is voluminous and becomes significant if the entire debug log is continuously collected. In addition, debug log outputted to the storage is insufficient for analysis depending on a problem.

Then, a note type PC (personal computer) or similar devices including a log collection use tool is disposed, upon a contract, in a customer site that possibly causes a problem.

The note type PC continuously picks up and stores log in a HDD (Hard Disk Drive), and is collected after a while. Otherwise, log output use firmware is temporarily installed in the customer site to pick up log.

Further, when firmware capable of resolving a problem is released, a customer suffering the problem cannot recognize such a release. Thus, the customer that needs update of the firmware can be neglected for a longtime.

SUMMARY OF THE PRESENT INVENTION

Accordingly, an object of the present invention is to improve such background arts technologies and provides a new and novel remote monitoring system for quickly dealing with bug.

Such a new and novel printing apparatus remote monitoring system includes a center system that remotely monitors a plurality of printing apparatuses, and a plurality of monitoring mediation apparatuses that mediate communications between the plurality of printing apparatuses and the center system.

The center system includes a bug countermeasure policy storage device that stores software bug information created in the printing apparatus linking with a bug countermeasure policy. The software bug information includes a type of the printing apparatus, a version of firmware implemented in the printing apparatus, and abnormal information possibly caused in combination between the printing apparatus and the firmware.

The bug countermeasure policy includes a policy to update to firmware having taken bug countermeasure and collects debug log. The software bug information and bug counter measure policy are updated from a terminal provided at the center system. The monitoring mediation apparatus obtains type information and firmware version information of the responsible printing apparatus therefrom or an inputting apparatus. The monitoring mediation apparatus notifies the center system of the type and the firmware version while requesting the center system for software bug information and bug countermeasure policy corresponding to the printing apparatus.

The center system extracts software bug information and bug countermeasure policy in accordance with the type and the firmware version of the printing apparatus upon receiving the type and the firmware version from the monitoring mediation apparatus.

The monitoring mediation apparatus includes a storing device and the monitoring mediation apparatus receives the software bug information and bug countermeasure policy from the center system and stores linkage between the software bug information and the bug countermeasure policy in the storing device.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIGS. 2A to 2C collectively illustrates an exemplary table showing combination of software bug information and bug countermeasure policy stored in a bug countermeasure policy storing device of FIG. 1;

PREFERRED EMBODIMENTS OF THE PRESENT INVENTION

Figure 1:
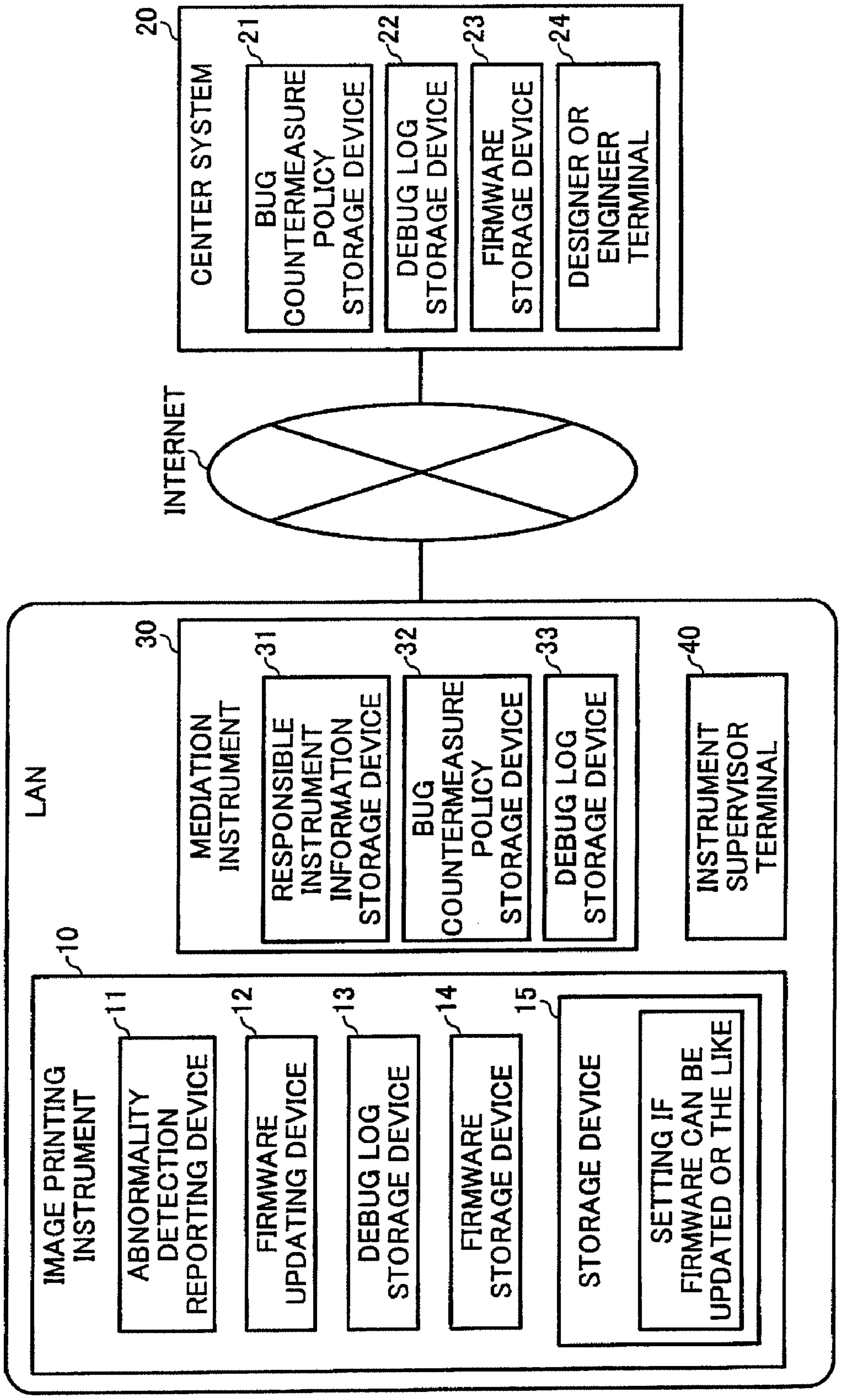
FIG. 1 is a block chart illustrating a remote printing apparatus monitoring system according to one embodiment of the present invention.

Referring now to the drawing, wherein like reference numerals designate identical or corresponding parts throughout several views, in particular in FIG. 1, an exemplary remote printing apparatus monitoring system is described. The remote printing apparatus monitoring system includes a plurality of image printing apparatuses 10, a center system 20 that remotely monitors the image printing apparatuses 10, and a mediation apparatus (i.e., a monitoring mediation apparatus) 30 that mediates communications between a responsible image printing apparatus 10 and the center system 20. 40 denotes a terminal for a printing apparatus controller that controls the image printing apparatus 10. The image printing apparatus 10 and the mediation apparatus 30 are connected to communicate with each other by LAN (Local Area Network). As a matter of convenience, one set of the image printing apparatus 10 and the mediation apparatus 30 is described. However, plural sets are practically employed. Each of the mediation apparatuses 30 communicates with a plurality of responsible image printing apparatuses 10, while communicating with the center system 20. The LAN connecting the image printing apparatuses 10 to the mediation apparatus 30 is further connected to the center system via Internet.

The center system 20 includes a bug countermeasure policy storage device 21 including registration of linkage between software bug information of the image printing apparatus 10 and a policy of countermeasure against each of software bugs. The center system 20 includes a debug log storing device 22 that obtains and stores debug log picked up in the image printing apparatus 10, a firmware storage device 23 that stores several kinds of firmware used by the image printing apparatus 10, and a designer terminal 24 that allows a designer or the like to update the contents of the bug countermeasure policy storage device 21 and refer to the contents of the debug log stored in the debug log storage device 22. The designer terminal 24 can be located at everywhere as far as the designer can operate and browse information stored in the storage.

FIGS. 2A, 2B, and 2C each illustrates the linkage between the software bug information registered in the bug countermeasure policy storage device 21 and the bug countermeasure policy.

The software bug information includes a linkage between a type of the image printing apparatus 10, a version of software implemented in the printing apparatus, and abnormal information possibly occurred in combination of a printing apparatus and firmware. The type includes a classification of a model, such as AAAA, etc., and a model number, such as 00000 to 200000, etc., of the image printing apparatus 10. The firmware version includes a classification of a number, such as 1.01, etc. The abnormal information includes a classification of combination of a code, such as SC001, etc., which represents an abnormal condition, and an occurrence frequency.

The abnormal condition includes specified service call, parse error, and abnormality of collected information or the like. Further, the occurrence frequency includes quick response to every occurrence, response when occurred a prescribed times, and response when continuously occurred for a prescribed time period, or the like.

The bug countermeasure policy may include updating to prescribed bug countermeasure taken firmware, collecting debug log with a prescribed command, such as rsh (remote shell) command, etc., and collecting debug log with a prescribed protocol, such as HTTPS/SOAP, etc.

The bug countermeasure policy may also include updating to log collection use special firmware (firmware specialized in a function of collecting debug log) and then collecting debug log. Further, when bug countermeasure policy includes collection of debug log, a collection time period, such as one-month, snap shot, a week, etc., is registered.

Further, a debug number may be registered as an identifier identifying the collected debug log along with another identifier identifying a contact name, such as designer XXX, etc., to be notified of the debug log.

An collection time period for the debug log may be set to the snap shot, a few hours, a designated date, and soon. To extract only necessary information among collected log, a plurality of regular expression can be designated for limiting a number of logs.

These software bug information and bug countermeasure policy may be updated through the designer terminal 24 as needed. The designer operates the designer terminal 24 to register software bug information and bug countermeasure policy in a bug countermeasure policy storing device 21 in accordance with a bug found during development, evaluation, and implementation of the firmware.

The designer preferably registers a bug countermeasure policy in accordance with software bug information based on the below described determinations.

First, when bug is already known and bug countermeasure firmware has been released, updating to the bug countermeasure firmware is selected as a bug countermeasure policy.

Second, when bug is already known but is negligible, a bug countermeasure policy is not registered.

Third, when bug is already known but is not yet taken a countermeasure even if a debug log use firmware has been released, a bug countermeasure policy is to update to debug log collection use firmware, execute and collect debug log for a prescribed time period, and returns to ordinary operation use firmware.

Fourth, when bug is unknown and debug log collection firmware has been released, a bug countermeasure policy is to update to debug log collection use firmware, and collect debug log for a prescribed time period, and then returns to an ordinary operation use firmware.

The bug countermeasure policies determined as above are registered in the bug countermeasure policy storing device 21 while linking with a model, a model number, a firmware version, an abnormality condition, and an occurrence frequency.

Now, an exemplary configuration of an image printing apparatus 10 is described. The image printing apparatus 10 includes an abnormality detection reporting device 11 that detects abnormality during firmware implementation and notifies a mediation apparatus 30 of a code representing the abnormality. The image printing apparatus 10 also includes a firmware updating device 12 that receives an instruction from the mediation apparatus 30 and updates to prescribed firmware in accordance with the instruction in the firmware storing device 14. The image printing apparatus 10 further includes a debug log storage device 13 that stores debug logs picked up during implementation of the firmware, and a firmware storage device 14 that stores firmware read and implemented when the image printing apparatus 10 starts operation.

Further, the storage device 15 stores settings if update of firmware and collection of debug log are each allowed or not.

Now, an exemplary configuration of the mediation apparatus 30 is described. The mediation apparatus 30 includes a responsible printing apparatus information storage device 31 that stores printing apparatus information related to a plurality of image printing apparatuses 10 that the mediation apparatus is responsible for. The responsible printing apparatus information storage device 31 includes registrations of a model, a model number, a firmware version, and a contact name of a person in charge of a printing apparatus 10 that the mediation apparatus 30 is responsible for.

The mediation apparatus 30 includes a bug countermeasure policy storage device 32 that extracts and stores only software bug information and bug countermeasure policies corresponding to the responsible printing apparatus registered in the responsible printing apparatus information storage device 31 among those stored in the bug countermeasure policy storage device 21. Further, the mediation apparatus 30 includes a debug log storage device 33 that stores debug log collected from the image printing apparatus 10.

The above-mentioned image printing apparatus 10, the center system 20, and the mediation apparatus 30 collectively realizes various functions and operations and serves as an operation device when a processing device, such as a processor, etc., executes program, such as firmware, etc.

Further, each of the storage devices is arranged in a storing region of a storing apparatus.

Further, communications between the printing apparatuses and the center system are executed via a prescribed communication apparatus in accordance with communication protocol.

Now, an exemplary operation of the above-mentioned configuration is specifically described with reference to FIGS. 3 to 6, wherein an exemplary operation of a printing apparatus remote monitoring system with the above-mentioned configuration is illustrated.

Figure 3:
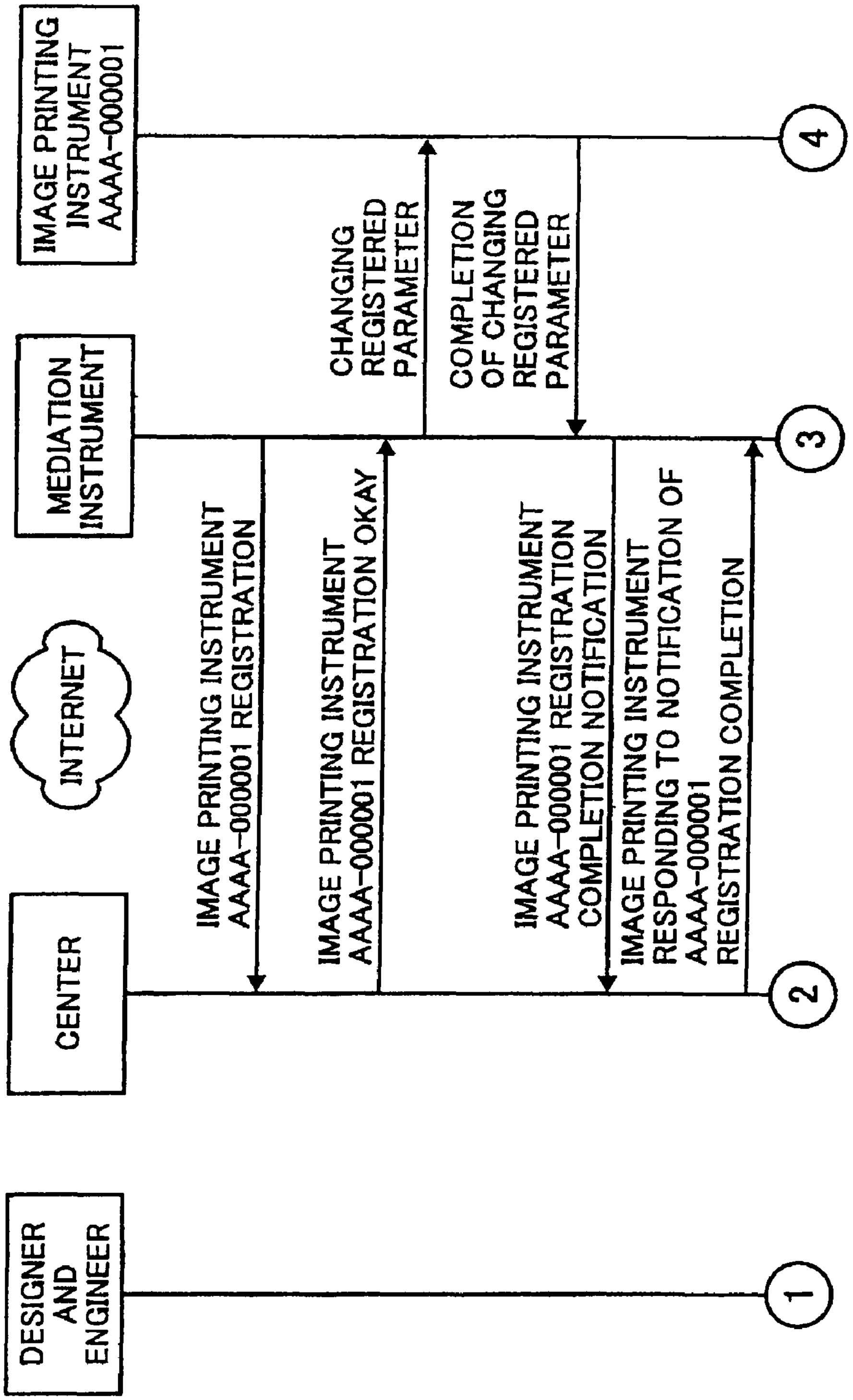
FIG. 3 is a flowchart illustrating an exemplary operation of the remote printing apparatus monitoring system of FIG. 1.
Figure 4:
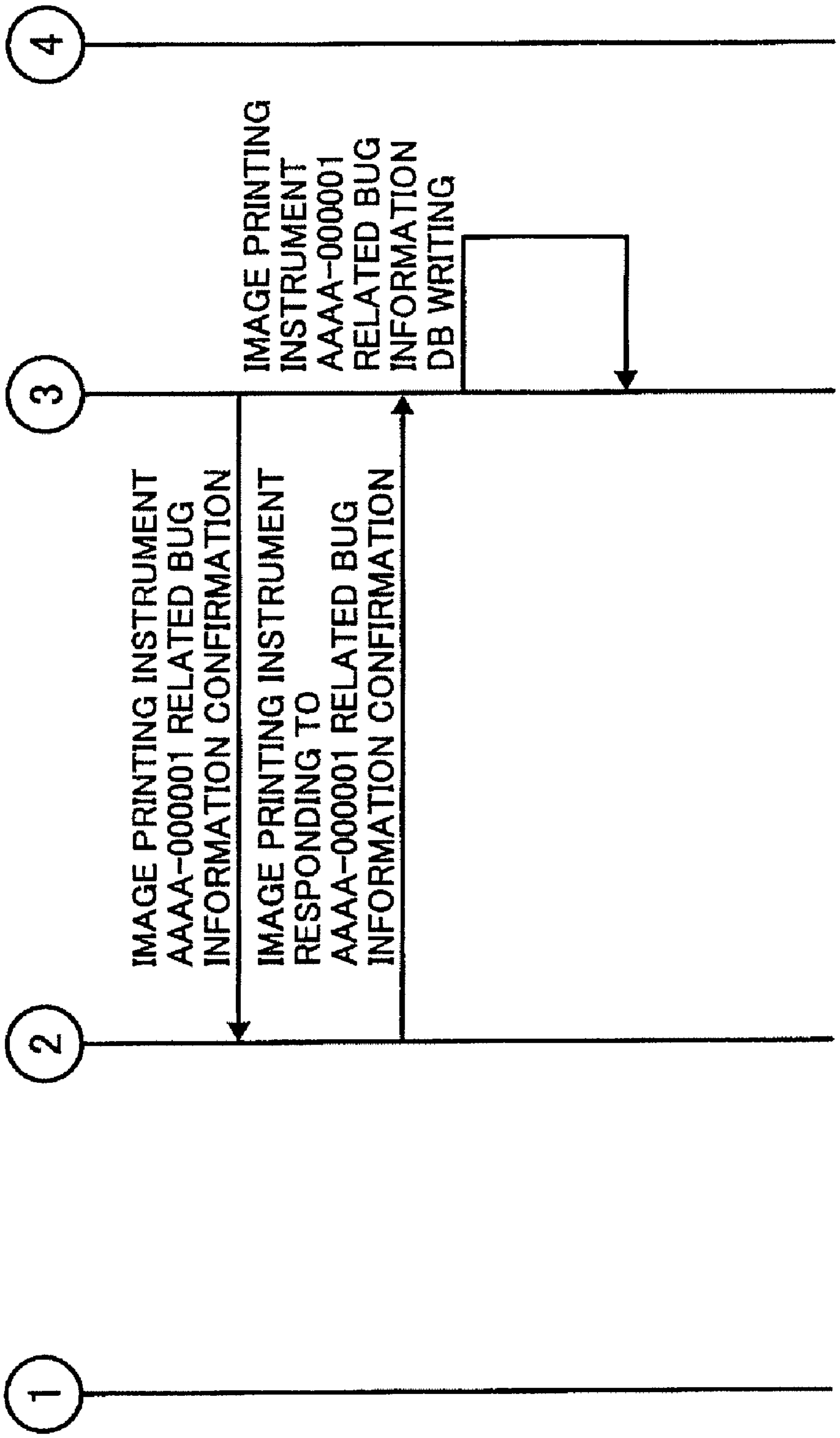
FIG. 4 is a flowchart illustrating another exemplary operation of the remote printing apparatus monitoring system of FIG. 1.
Figure 5:
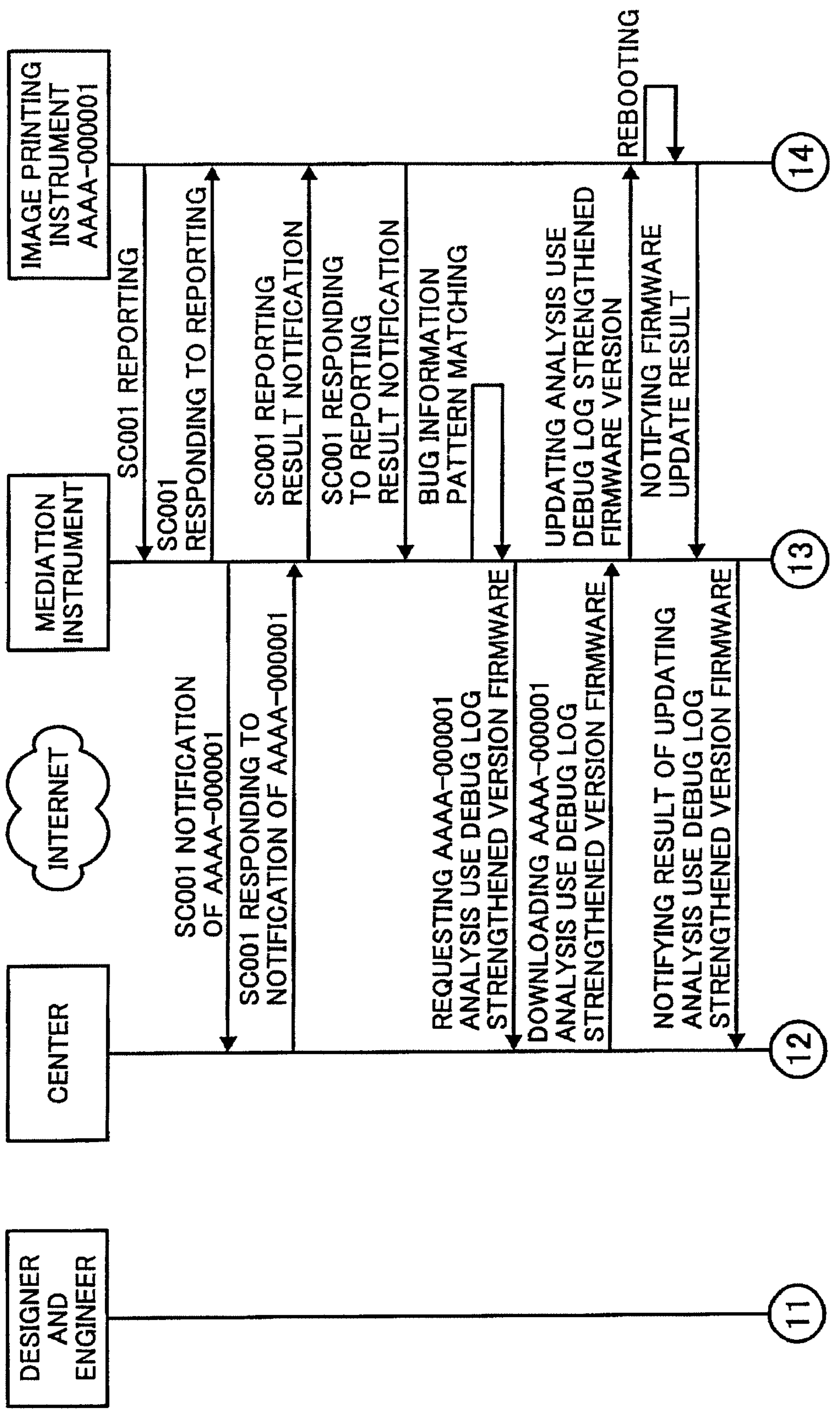
FIG. 5 is a flowchart illustrating still another exemplary operation of the remote printing apparatus monitoring system of FIG. 1.

As shown, first to fourth terminals in FIG. 3 are connected to corresponding parts in FIG. 4, respectively. Eleventh to fourteenth terminals in FIG. 5 are connected to corresponding parts in FIG. 6, respectively.

Initially, an exemplary operation when a mediation apparatus 30 acquires abstract of bug countermeasure policy from a center system 20 is described with reference to FIGS. 3 and 4.

When instructed to take care of an image printing apparatus 10 (Model AAAA, Model number 000001), the mediation apparatus 30 acquires model, model number, firmware version information, and contact name information of a printing apparatus monitor of the image printing apparatus 10.

The mediation apparatus 30 links with each other and registers these information in the responsible printing apparatus information storage device 31.

The mediation apparatus 30 notifies the center system 20 of the registration of the image printing apparatus 10. Upon receiving the notification, the center system 20 executes information processing regarding the registration of the image printing apparatus 10. When the information processing is completed, the center system 20 notifies the mediation apparatus 30 of the effect that the information processing related to the registration of the image printing apparatus 10 is completed (registration Okay). Upon receiving the notification, the mediation apparatus 30 instructs the image printing apparatus 10 to change a prescribed registration parameter, such as an IP address of the responsible mediation apparatus, etc. When the instruction is received and the registration parameter has been changed as instructed, the image printing apparatus 10 receiving the instruction notifies the mediation apparatus 30 of the effect that registration parameter has been changed. Upon receiving the notification, the mediation apparatus 30 notifies the center system 20 of the effect that the registration parameter has been changed in the image printing apparatus 10 as notification of registration completion.

In response to the reception of the registration completion notification, the center system 20 returns a response to the mediation apparatus 30.

Upon receiving the response, the mediation apparatus 30 reads a model, a model number, and firmware version information of the image printing apparatus 10, registered just before, from the responsible printing apparatus information storage device 31, and transmits such information to the center system 20. Then, the mediation apparatus 30 requests a bug countermeasure policy corresponding to the image printing apparatus 10 to the center system 20.

The center system 20 with the request then extracts software bug information and a bug countermeasure policy linked to a combination of a model, a model number, and firmware version information of the image printing apparatus 10, which are received from the mediation apparatus 30, from the bug countermeasure policy storage device 21.

Then, the center system 20 transmits thus extracted software bug information and bug countermeasure policy to the mediation apparatus 30 as a related bug information confirmation response.

Upon receiving the software bug information and bug countermeasure policy from the center system 20, the mediation apparatus 30 registers linkage of the software bug information and bug countermeasure policy in the bug countermeasure policy storage device 32 (Related bug information DB writing). Thus, since the mediation apparatus 30 only extracts and holds bug countermeasure policy needed for the responsible image printing apparatus 10, quantity of information can be reduced.

Figure 6:
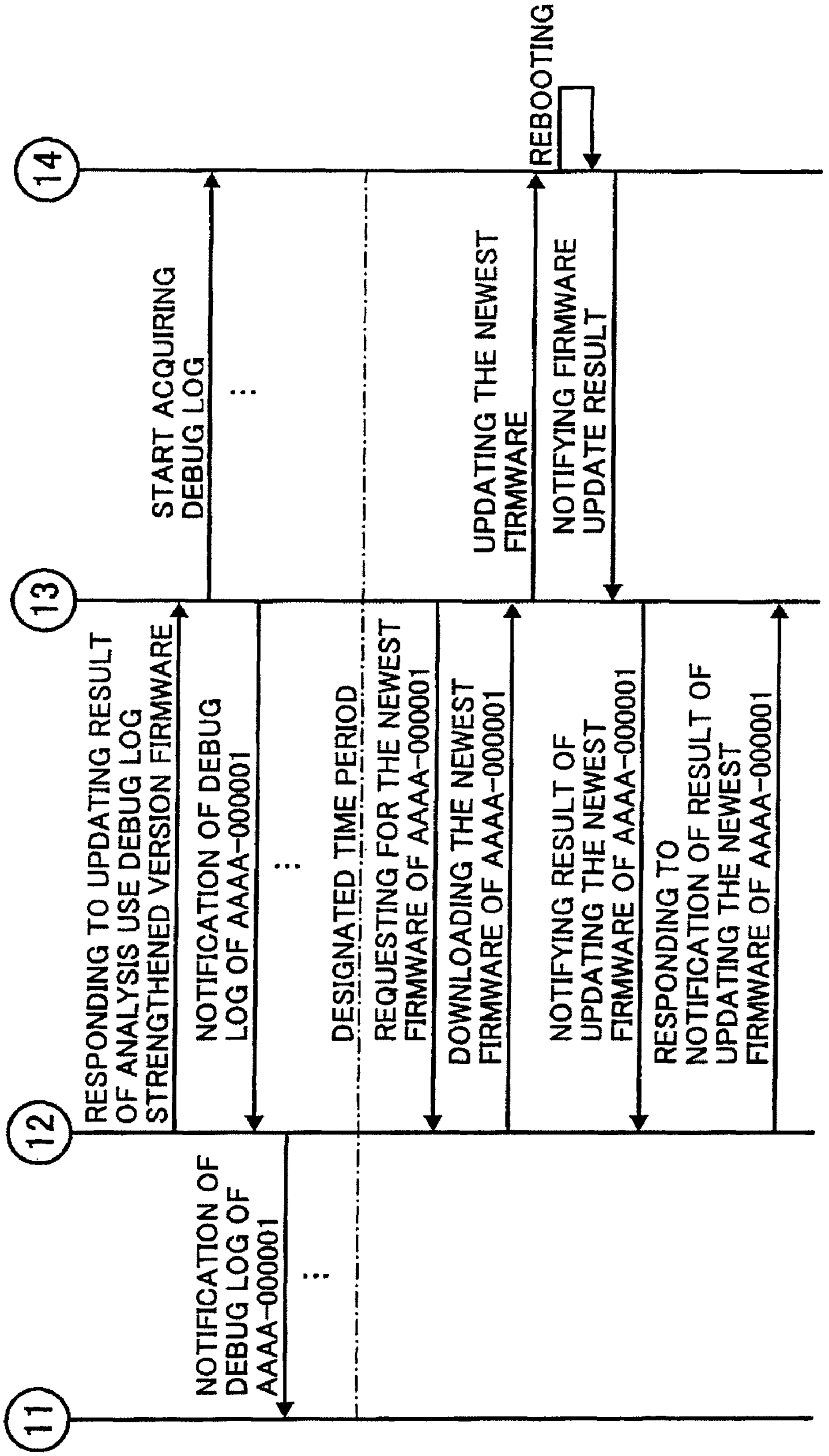
FIG. 6 is a flowchart illustrating yet another exemplary operation of the remote printing apparatus monitoring system of FIG. 1.

Now, an exemplary operation executed when an image printing apparatus 10 detects abnormal information is described with reference to FIGS. 5 and 6.

When abnormality occurs during running of firmware in an image printing apparatus 10 (e.g. Model AAAA, Model Number 000001), an abnormality detection reporting device 11 recognizes an abnormal condition, and reports such an effect to the mediation apparatus 30 with a code (SC001) representing the abnormality. Upon receiving the report, the mediation apparatus 30 returns a response to the image printing apparatus 10 as the report sender, and notifies the center system 20 of the effect that the image printing apparatus 10 assigned the Model AAAA and Model Number 000001 outputs the abnormality condition SC001.

Upon receiving the notification, the center system 20 returns a response to the mediation apparatus 30 as the report sender. The mediation apparatus 30 then notifies the image printing apparatus 10, which has outputted the report, of the effect that the reporting to the center system 20 is completed.

Upon receiving the notification, the image printing apparatus 10 returns a response to the mediation apparatus 30.

Upon receiving the response, the mediation apparatus 30 obtains and learns the model, the model number, and the firmware version information from the responsible printing apparatus information storage device 21.

The mediation apparatus then checks if software bug information formed from a combination of the model, the model number, the firmware version information, and the code SC001 is registered in the bug countermeasure policy storage device 32 (i.e., Bug information pattern matching).

If the software bug information is registered in the bug countermeasure policy storage device 32 and an occurrence frequency is suitable to take measure, the mediation apparatus 30 reads bug countermeasure policy linked with the software bug information from the bug countermeasure policy storage device 32, and executes bug countermeasure policy designated there as described below.

In a first exemplary operation, when the bug countermeasure policy designates updating to firmware enabling to pick up an increased number of analysis use debug logs (herein below, referred to as enriched version firmware), the mediation apparatus requests the log enriched version firmware to the center system 20.

Upon receiving the request, the center system 20 reads and provides the log enriched version firmware from the firmware storage device 23 to the mediation apparatus 30 as a requester (i.e., downloading of firmware).

The mediation apparatus 30 stores the log enriched version firmware provided by the center system 20 in a storage device, and transmits the log enriched version firmware to the image printing apparatus 10 that has outputted the above-mentioned report together with an instruction to update firmware.

Upon receiving the log enriched version firmware with the instruction, the firmware updating device 12 of the image printing apparatus 10 updates and stores the log enriched version firmware in the firmware storage device 14.

The image printing apparatus 10 is then rebooted.

The image printing apparatus 10 restarts operating by reading the log enriched version firmware from the firmware storage device 14, and notifies the mediation apparatus 30 of the effect that the firmware update is completed (i.e., firmware updated result notification). Upon receiving the notification, the mediation apparatus 30 notifies the center system 20 of the effect that the firmware update is completed in the image printing apparatus 10 (i.e., log enriched version firmware updated result notification).

Upon receiving the notification, the center system 20 returns a response to the mediation apparatus 30.

Now, the second exemplary operation is described.

The mediation apparatus 30 requests the image printing apparatus 10 to acquire debug log when collection of debug log is designated as a bug countermeasure policy corresponding to the report of the image printing apparatus 10.

Thus, the image printing apparatus 10 is requested to provide the debug log using prescribed protocol defined by the bug countermeasure policy.

The image printing apparatus 10 in the course of implementation of the log enriched version firmware is then controlled to write volatile debug log per module in a small memory region serving as a debug log storage device 13 or displayed on a laboratory use screen.

When the mediation apparatus 30 requests collection of debug log, the image printing apparatus 10 reads and transmits debug log stored in the debug log storage device 13 or outputted onto the laboratory use screen as needed in accordance with designated protocol.

The mediation apparatus 30 stores debug log received from the image printing apparatus 10 in the debug log storage device 33, and reads and notifies the debug log to the center system 20 from the debug log storage device 33 in a unit when an amount of the storage of the debug log reaches a prescribed level. The center system 20 confirms a debug log reporting destination registered in the bug countermeasure policy storage device 21 with reference to the software bug information of the image printing apparatus 10 that outputs debug log.

The above-mentioned operation for collecting debug log is executed over a debug log collection time period defined by bug countermeasure policy.

The third exemplary operation is now described.

Upon detecting elapse of the debug log collection time period after starting collection of the debug log as defined in the bug countermeasure policy, the mediation apparatus 30 requests the center system 20 to provided the newest firmware in accordance with the model and/or model number of the image printing apparatus 10.

Upon receiving the request, the center system 20 reads the newest firmware from the firmware storage device 23 in accordance with the model and/or model number of the image printing apparatus 10, and transmits the newest to the mediation apparatus 30 as a requester (Downloading of the newest firmware). The mediation apparatus 30 stores the newest firmware provided by the center system 20 in a storage device and transmits the newest to the image printing apparatus 10 along with an instruction of updating the firmware.

Upon receiving the instruction in the image printing apparatus 10, the firmware updating device 12 updates to and stores the newest firmware received from the mediation apparatus 30 in the firmware storage device 14. The image printing apparatus 10 is then rebooted. The image printing apparatus 10 starts operating by reading the newest firmware from the firmware storage device 14, and notifies the mediation apparatus 30 of the effect that the firmware update is completed (i.e., firmware updated result notification). The mediation apparatus 30 then notifies the center system 20 of the effect that the firmware update is completed in the image printing apparatus 10 (i.e., the newest firmware updated result notification). The center system 20 then returns a response to the mediation apparatus 30.

The newest firmware can be the same as a version of firmware before being updated to the log enriched version firmware. That is, the firmware before being updated to the log enriched version firmware operates again.

Now, the fourth exemplary operation is described.

As a result of the above-mentioned bug information pattern matching, when the bug countermeasure policy corresponding to the software bug information only represents that firmware is to be updated to the newest firmware, the above-mentioned third exemplary operation is executed regardless of the debug log collection time period.

When software bug is already known and countermeasure there against is already taken, such a bug countermeasure policy is generally adopted.

Now, the fifth exemplary operation is described.

As a result of the above-mentioned bug information pattern matching, when the bug countermeasure policy corresponding to the software bug information only represents that debug log is to be collected, the above-mentioned second exemplary operation is executed. An ordinal operation use firmware other than the log enriched version firmware sometimes includes a simple debug log pick up function. In this situation, only collection of debug log can be a bug countermeasure policy for a model for which log enriched version firmware has not yet been released.

The sixth exemplary operation is now described.

As a result of the above-mentioned bug information pattern matching, when matching software bug information has not yet been registered, the mediation apparatus 30 sends a query to the center system 20 as to if matching software bug information has been registered at the present moment in the center system 20.

The center system 20 receiving the query confirms if software bug information and bug countermeasure policy of the query have been registered at the present moment in the bug countermeasure policy storing device 21, and reads and transmits these software bug information and bug countermeasure policy to the mediation apparatus 30 if the determination is positive.

The mediation apparatus 30 having received the transmission stores these software bug information and bug countermeasure policy in the bug countermeasure policy storage device 32. Then, the above-mentioned first to fifth operations are executed in accordance with the bug countermeasure policy.

Now, the seventh exemplary operation for rejecting firmware update or the like is described Possibility of firmware update or an operation accompanied by debug log collection may be set to the image printing apparatus 10. Specifically, a monitor of the image printing apparatus 10 can set information if the operations are rejected via a monitor interface provided by the image printing apparatus 10.

Then, the image printing apparatus 10 stores positive and negative setting information as to firmware update or the like in a storage device.

The image printing apparatus 10 receives the positive and negative settings via an operation panel of the image printing apparatus 10 or the monitor interface provided to an external printing apparatus monitoring terminal 40.

The image printing apparatus 10 then updates settings in the storage device in accordance with a change.

For example, the monitor can set in accordance with security policy of the respective customers, such as inhibition of update to the newest firmware, inhibition of updating to the log enriched version firmware, inhibition of debug log collection, etc.

Thus, the image printing apparatus 10 reports the effect to the mediation apparatus 30 that an operation corresponding to a prescribed request is inhibited when requested from the mediation apparatus 30.

Upon receiving the report, the mediation apparatus 30 reads a contact name of the monitor of the image printing apparatus 10 that has issued the report from a responsible printing apparatus information storage device 31, and creates and transmits a mail to sound if such setting can be changed to the contact name. A currently set inhibition condition, reasons for necessity of firmware update or debug log collection, and a link, such as URL, WebUI, etc., for accessing an interface to change the inhibition setting are automatically inserted into the sounding mail.

Then, the mediation apparatus 30 monitors canceling of the inhibition setting in the image printing apparatus 10.

When the monitor cancels inhibition setting for the firmware update or the debug log collection, the image printing apparatus 10 reports the effect to the mediation apparatus 30.

Upon receiving the report, the mediation apparatus 30 restarts execution of bug countermeasure policy, which is previously scheduled, and executes a prescribed applicable operation among the above-mentioned first to sixth operations.

Now, the eighth exemplary operation related to a method for collecting debug log is described.

The center system 20 or the designer terminal 24 may request collection of debug log to the mediation apparatus 30 while designating the image printing apparatus 10.

The mediation apparatus 30 then reads and provides debug log of the designated image printing apparatus 10 from the debug log storage device 33 to the center system 20 or the designer terminal 24.

What is claimed is:

1. A printing apparatus remote monitoring system, comprising:

a center system configured to remotely monitor at least two printing apparatuses; and at least two monitoring mediation apparatuses each configured to mediate communications between the at least two printing apparatuses and the center system;

wherein said center system includes a bug countermeasure policy storage device configured to store software bug information created in the at least two printing apparatuses linking with a bug countermeasure policy, said software bug information including type information of the at least two printing apparatuses, version information of firmware implemented in the at least two printing apparatuses, and abnormal information occurring during running of a firmware in the at least two printing apparatuses, said bug countermeasure policy including policy to update to the firmware having taken bug countermeasure and collect a debug log, said software bug information and said bug countermeasure policy being updated from a terminal provided at the center system, wherein, when a responsible printing apparatus of the at least two printing apparatuses detects an abnormality, a corresponding monitoring mediation apparatus of said at least two monitoring mediation apparatuses obtains type information and firmware version information of the responsible printing apparatus from the responsible printing apparatus or an inputting apparatus, said corresponding monitoring mediation apparatus notifying the center system of the type information and the firmware version information while requesting the center system for software bug information and bug countermeasure policy corresponding to the responsible printing apparatus, wherein said center system extracts software bug information and bug countermeasure policy in accordance with the type information and the firmware version information of the responsible printing apparatus upon receiving the type information and the firmware version information from the corresponding monitoring mediation apparatus, and wherein said corresponding monitoring mediation apparatus includes a mediation storing device, said corresponding monitoring mediation apparatus receiving the software bug information and the bug countermeasure policy from the center system and storing linkage between the software bug information and the bug countermeasure policy in the mediation storing device.

2. The printing apparatus remote monitoring system, as claimed in claim 1, wherein each of said at least two printing apparatuses includes a firmware storing device, and reads and operates the firmware installed in the firmware storing device, wherein, said responsible printing apparatus transmits abnormal information representing the abnormality to the corresponding monitoring mediation apparatus in charge of the responsible printing apparatus when detecting the abnormality, wherein said corresponding monitoring mediation apparatus retrieves the bug countermeasure policy coincident with the abnormal information included in the firmware version information, the software bug information, and the type information of the responsible printing apparatus in the mediation storing device upon receiving the abnormality information from the responsible printing apparatus, and wherein the bug countermeasure policy is executed in the responsible printing apparatus that has outputted the abnormal information.

3. The printing apparatus remote monitoring system as claimed in claim 1, wherein said corresponding monitoring mediation apparatus instructs the responsible printing apparatus that outputs the abnormal information to update bug countermeasure policy completed firmware when a determined bug countermeasure policy is to update to the countermeasure policy completed firmware, or instructs the responsible printing apparatus to update to debug log collection use firmware when the determined bug countermeasure policy is to update to the debug log collection use firmware, or pick up debug log from the responsible printing apparatus using the debug log collection use firmware over a prescribed time period, and instructs updating of ordinal operation use firmware after the prescribed time period has elapsed when the determined bug countermeasure policy is to collect the debug log for the prescribed time period, and wherein said responsible printing apparatus updates a current firmware stored in a firmware storage device to updated firmware in accordance with instruction of the firmware update upon receiving the updated firmware from the corresponding monitoring mediation apparatus, said responsible printing apparatus executing the updated firmware, and picking up a prescribed unit of the debug log when the updated firmware requests to pick up the debug log, and transmits the debag log to the corresponding monitoring mediation apparatus in charge of the responsible printing apparatus.

4. The printing apparatus remote monitoring system as claimed in claim 3, wherein said corresponding monitoring mediation apparatus obtains and stores the debug log from the responsible printing apparatus in a debug log storage, and reads and transmits the debag log to the center system when the prescribed unit of the debug log is accumulated.

5. The printing apparatus remote monitoring system as claimed in any one of claims 3 and 4, wherein prescribed protocol for collecting the debug log from the responsible printing apparatus is included in the bug countermeasure policy when the bug countermeasure policy is to collect the debug log over the prescribed time period, and wherein said corresponding monitoring mediation apparatus designates the prescribed protocol included in the bug countermeasure policy to the responsible printing apparatus when collecting the debug log from the responsible printing apparatus, and wherein said responsible printing apparatus outputs the debug log in accordance with the prescribed protocol.

6. The printing apparatus remote monitoring system as claimed in claim 5, wherein said responsible printing apparatus stores positive and negative setting information for allowing and inhibiting the firmware update or the debug log collection in a printing storage device, said responsible printing apparatus including a monitor interface for changing the positive and negative setting information via the monitor interface, wherein said responsible printing apparatus notifies the positive and negative setting information when either the firmware update or the debug log collection is instructed by the corresponding monitoring mediation apparatus, and wherein the corresponding monitoring mediation apparatus reads a contact name of the monitor interface that has issued a report from the mediation storing device storing the contact name upon receiving the report, said corresponding monitoring mediation apparatus urging the responsible printing apparatus to change the positive and negative setting information and permit updates to the firmware and the debug log collection for the contact name.

* * * * *